UNITED STATES PATENT OFFICE.

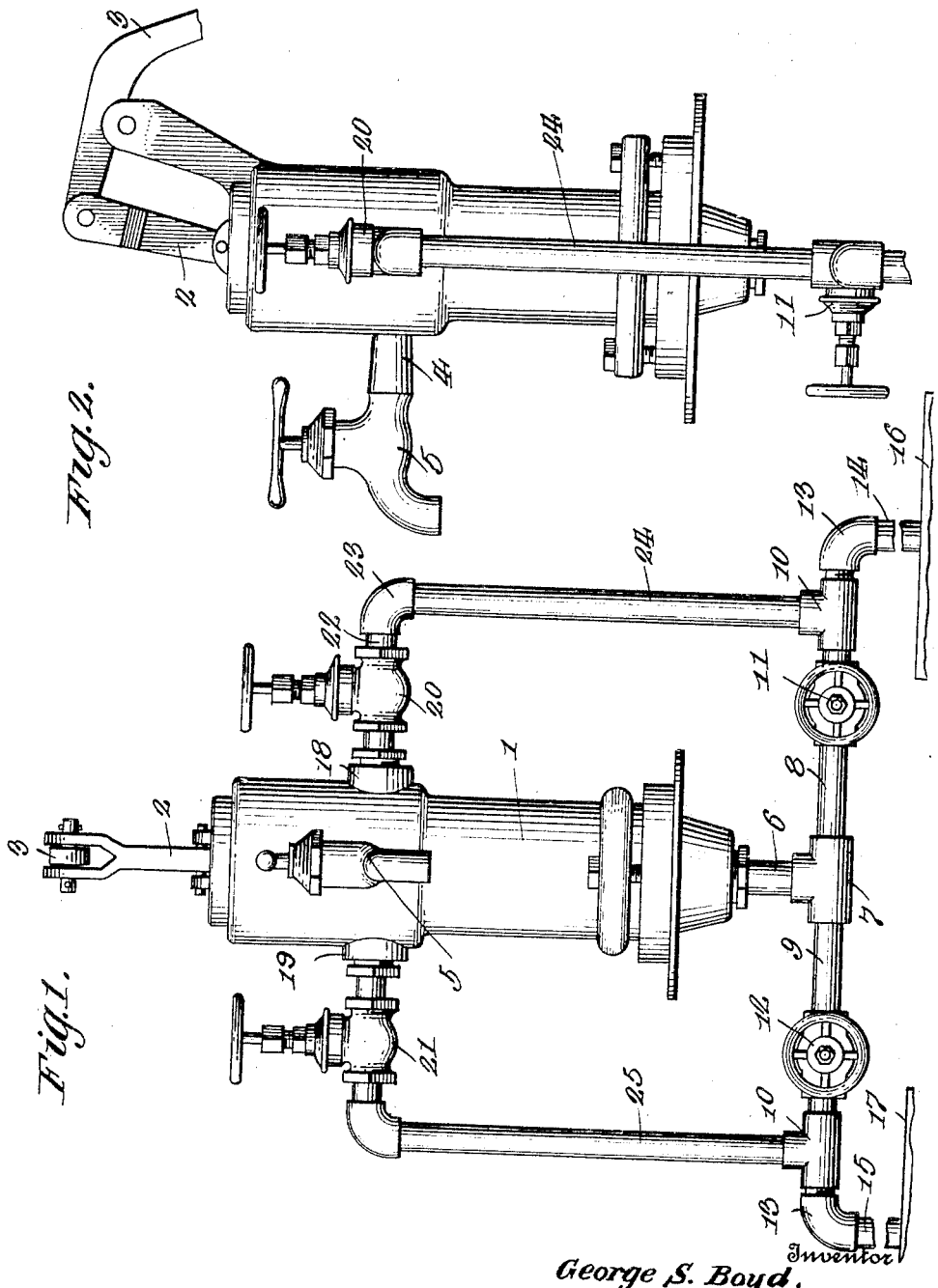

GEORGE S. BOYD, OF BLY, OREGON.

PUMP.

1,258,527.	Specification of Letters Patent.	Patented Mar. 5, 1918.

Application filed September 27, 1916. Serial No. 122,461.

*To all whom it may concern:*

Be it known that I, GEORGE S. BOYD, a citizen of the United States, residing at Bly, in the county of Klamath and State of Oregon, have invented certain new and useful Improvements in Pumps, of which the following is a specification.

This invention has relation to pumping mechanism, and the nature and objects thereof will be readily apparent to those skilled in the art to which it appertains in the light of the following explanation of the accompanying drawings, illustrating what I now believe to be the preferred embodiment, or mechanical expression of my invention from among other forms and arrangements within the spirit thereof or the scope of the appended claims.

However, an object of the invention is to provide in combination with a pump, an arrangement of fluid conduits and valves therein, whereby upon manipulation of said valves the pump may be operable to transfer liquid from one tank to another, from either tank separately, or both tanks simultaneously to any other receiving receptacle without altering in any manner whatsoever the structure of the apparatus.

In addition to the foregoing my invention comprehends improvements in the details of construction and arrangement of parts to be hereinafter described and particularly pointed out in the appended claims.

In the accompanying drawings in which similar and corresponding parts are designated by the same characters of reference throughout the several views in which they appear;

Figure 1, is a view in front elevation of the conventional form of pump having associated therewith conduits and valves in accordance with my invention, and Fig. 2, is a view thereof in side elevation.

Before proceeding with a detail description of my invention it is to be understood that while the pump embodied herein is adapted to be manually operated nevertheless steam, electric, or other power, may be utilized if desired.

In the present embodiment of my invention, I provide a pump indicated at 1 either of a force or the suction type, having a piston rod 2, a handle 3, and an outlet 4 controlled by means of a hand valve 5. The inlet of the pump which in the present instance is provided at the lower end thereof, is connected by means of a relatively short section of piping 6 to a T-coupling 7. Pipe sections 8 and 9 are provided at the right and left hand sides respectively of the coupling, with the terminals of said pipe sections 8 and 9 connected respectively to T-couplings 10, the pipes 8 and 9 have interposed within them respectively valves 11 and 12 for a purpose which will be presently obvious. Each of said T-couplings 10 is provided with elbow-couplings 13 to the right-hand one of which there is further provided a depending stand pipe 14, and a similar stand pipe 15 is connected to the left-hand coupling. These stand pipes may be led to tanks 16 and 17 or to any receptacle or locality from which fluid is to be drawn or to which fluid is to be supplied.

The pump 1 is further provided with right and left hand outlets 18 and 19 respectively, the passage of which is controlled by hand valves 20 and 21, respectively. The opposite sides of each of the valves 20 and 21 are connected by means of nipples 22 and elbow couplings 23 to auxiliary right and left-hand stand pipes 24 and 25, which depend from said couplings and are connected at their lower ends to the upstanding members of the T-couplings 10.

In recapitulation, it will be observed that there is provided a pump having its intake opening connected to two sources of fluid supply, said pump having two outlet branches each of which is reconnected to one of the aforesaid sources of supply, these branches and supply pipes being suitably provided with valves to control the fluid flowing therethrough for a purpose which now appears.

Assuming that fluid is to be transferred from the tank 16 to the tank 17, the valves 11 and 21 are opened, while the valves 12 and 20 are moved to closed position. By actuating the operating hand lever 3 of the pump, the fluid will be dispersed from the tank 16 through the stand pipe 14, through the horizontal connecting pipe 8, the intermediate stand pipe 6 to the pump from whence it is removed by actuation of the piston through the valve 21, down the auxiliary stand pipe 25, through the left-hand stand pipe 16, to the tank 17.

Conversely should it be desired to transfer the fluid from tank 17 to 16, the valves 12 and 20 are opened while the valves 11 and 21 are closed. Reciprocation of the pump piston in a manner as before results in the travel of the fluid in a reverse direction.

Should it become necessary to empty either tank separately, and assuming for the purpose of explanation, that tank 16 is to be emptied, the valves 12, 21 and 20, are closed leaving the valve 11 open. Upon actuation of the pump, the fluid of the tank 16 will arise through the stand pipe 14, the horizontal pipe section 8, through the vertical section 6 to the pump, and out through the auxiliary outlet 4, the valve 5 being opened to permit discharge of the fluid. The tank 17 may be emptied in a similar manner by opening the valve 12 and closing the remaining valves.

Thus it will be seen that I have provided a novel arrangement whereby fluid may be transferred from one tank to another as is frequently occasioned in chemical factories, packing houses and various industries, without necessitating the change of the construction of the pump, and requiring but a simple manipulation of but a few valves all preferably located in proximity to the pump, and easily accessible.

While I have illustrated and described my invention with some degree of particularity, I realize that in practice various alterations thereover may be made, and I therefore reserve the right and prvilege of changing the form of the details of construction and arrangement of parts without departing from the spirit of the invention or the scope of the appended claims.

Having thus described my invention what I claim as new and desire to secure by Letters Patent is:

1. An apparatus of the character described including a pump having a single inlet at its lower end and a pair of oppositely disposed outlet openings adjacent its upper end, together with a single valve controlled opening between said pair of outlet openings, a pipe connected at a point intermediate its length to the inlet opening, a pair of valves in said pipe, one at each side of the point of connection thereof with the pump inlet, a pair of stand pipes, one at each side of the pump connected to the first mentioned pipe at points beyond the valves interposed therein, the opposite ends of the stand pipes being connected to the pair of pump outlets, and a valve in each of said stand pipes.

2. An apparatus of the character described including a pump having a single inlet at its lower end, a pair of oppositely disposed outlets adjacent its upper end and a single valve controlled outlet between said pair of outlets, a section of pipe extending from the inlet, a T-coupling secured to said pipe section, a pair of pipe sections extending from said T-coupling, a valve in each one of said pipe sections, a T-coupling at the extremities of the pipe sections, stand pipes connected to said last mentioned T-coupling, pipe sections connecting the upper ends of the stand pipes to the pair of pump outlets, and a valve in each one of said last mentioned pipe sections.

In testimony whereof I affix my signature in presence of two witnesses.

GEORGE S. BOYD.

Witnesses:
D. F. DRISCOLL,
A. D. HAMAKER.

Copies of this patent may be obtained for five cents each, by addressing the "Commissioner of Patents, Washington, D. C."